(12) United States Patent
Megens (10) Patent No.: US 8,567,795 B2
(45) Date of Patent: Oct. 29, 2013

(54) LOWER FRAME FOR A PRODUCT HOLDER, HOLDER AND OPERATING PROCEDURE

(75) Inventor: Eduardus Johannes Wilhelmus Marinus Megens, 's-Hertogenbosch (NL)

(73) Assignee: Ribot B.V. (NL)

( * ) Notice: Subject to any disclaimer, the term of this patent is extended or adjusted under 35 U.S.C. 154(b) by 451 days.

(21) Appl. No.: 12/850,077

(22) Filed: Aug. 4, 2010

(65) Prior Publication Data

US 2011/0031259 A1    Feb. 10, 2011

(30) Foreign Application Priority Data

Aug. 4, 2009 (NL) ...................................... 2003329

(51) Int. Cl.
*B65D 90/02* (2006.01)

(52) U.S. Cl.
USPC .. 280/35; 280/79.11; 280/763.1; 280/33.991; 248/346.3

(58) Field of Classification Search
USPC ......... 280/79.11, 79.2, 35, 639, 38, 651, 762, 280/763.1, 767, 769, 33.991, 33.992, 280/33.996, 33.997; 248/346.01, 346.02, 248/346.07, 346.3, 188.1, 188.6, 128, 129, 248/144, 149, 150
See application file for complete search history.

(56) References Cited

U.S. PATENT DOCUMENTS

| | | | | |
|---|---|---|---|---|
| 3,964,762 A * | 6/1976 | Adams | .......................... | 280/639 |
| 4,346,906 A * | 8/1982 | Thorpe | ..................... | 280/33.996 |
| 4,456,273 A * | 6/1984 | McKinnon | ............... | 280/33.996 |
| 5,035,445 A * | 7/1991 | Poulin | ......................... | 280/763.1 |
| 5,040,809 A * | 8/1991 | Yang | ............................... | 280/42 |
| 5,829,765 A * | 11/1998 | Snider | ............................. | 280/42 |
| 5,897,012 A * | 4/1999 | Sortwell | ...................... | 220/4.28 |
| 6,419,198 B1* | 7/2002 | Einav | ....................... | 248/346.07 |
| 6,533,524 B2* | 3/2003 | English et al. | ................ | 414/458 |
| 7,503,571 B2* | 3/2009 | Cromie | ..................... | 280/79.11 |
| 8,006,984 B2* | 8/2011 | Chubb | ...................... | 280/33.998 |
| 2009/0078700 A1* | 3/2009 | Boivin | .......................... | 220/4.28 |
| 2011/0158761 A1* | 6/2011 | Jackson et al. | .................. | 410/96 |
| 2012/0234213 A1* | 9/2012 | Kiolbasa | ...................... | 108/53.5 |

FOREIGN PATENT DOCUMENTS

NL       1027821 C2    6/2006

* cited by examiner

*Primary Examiner* — John Walters
*Assistant Examiner* — Brian Swenson
(74) *Attorney, Agent, or Firm* — The Webb Law Firm, P.C.

(57) ABSTRACT

A basic frame for a holder for products, includes a first beam, fitted with at least a first support, to support the first beam on a basis, a second beam fitted with at least a second support, to support the second beam on the basis, and with the first beam linked at variable distances by at least a spacer, for the parallel positioning of the beams mainly distanced from each other at least in an unfolded position of the basic frame, as well as an arm stretched out in the direction of the second beam for a third support, linked to the first beam, for the support of the basic frame on the basis at a distance of at least a collapsed state of the basic frame from the first beam.

17 Claims, 10 Drawing Sheets

LOWER FRAME FOR A PRODUCT HOLDER, HOLDER AND OPERATING PROCEDURE

The present invention relates to the lower frame for a product holder or container, as well as a holder or container provided with such a frame. The invention specifically involves a foldable holder or container provided with such a frame, and the operating procedure for lifting or hoisting such holders.

Lower frames for product holders are known, as are foldable holders or containers. Such holders, equipped with two opposite side panels, and a rear panel which can be connected to the bottom section, wherein the holder is adjustable between the operational status in which the bottom section, the side panels and rear panel, surround—at least partially—a holder area, and the folded status in which the holder is folded as such that the side panels are positioned at a more closer distance from one another than in the operational status, are among others known from the Dutch patent 102782, indicated as a vertically foldable container, and have the advantage that they—when unloaded—take up a relatively small space and can thus be stored or transported more efficiently.

However, the prior art containers have the disadvantage that when folded, their horizontal position is not stable. Hence damages to the holders can occur, or working with containers could be delayed or hindered due to the fact that specific measures must be taken to prevent the containers to fall over when in folded position. The aim of the present invention is therefore to provide a solution to prevent the falling over of folded holders or containers.

For this purpose, the invention provides a lower frame for a product holder including a first beam, comprising at least a first support for supporting the first beam on a base and a second beam comprising at least a second support for supporting the second beam on a base, a second beam, provided with at least a second support for supporting the second beam on the basis, wherein the first beam is connected to the first beam by at least one spacer to enable substantial parallel positioning of the beams spaced apart in varying mutual distances in the collapsed state of the lower frame, an arm for a third support linked with the first beam, mainly extending in the direction of the second beam to support the basic frame on the basis on a distance from the first beam in a folded state of the basic frame.

If the first and second beams have been moved towards each other by means of the spacers—which are formed by the beams from which the frame is produced—in order to fold a holder connected to the frame, this folded holder will be folded in such a small package that in horizontal position it would only have an unstable balance. The stability specifically reduces if the first and second supports of the first and second beam are positioned closer together. Due to the support on the arm according to the present invention, which is positioned on a distance from the support on the first beam, even if the frame is folded, including the holder or container connected to the frame, a stable positioning and/or moving is possible. Specifically a number of supports could be positioned, i.e. two per beam or a total of four instead of at least the first and the second support.

Herein the first, second and third supports could function as static supports, but it is preferred that at least the first two supports included wheels, such as castors, to easily move the frame and related holder or container. Hence it is preferred that the third wheel includes a castor as well.

It is preferred that the arm is a little longer than the distance between the first and second beam in folded position, to allow the arm to provide a wider bearing surface for the holder, and thus providing improved stability. In order to also ensure that the arm and third support do not hinder the use of the holder or container, it is preferred that the arm is shorter than the distance between the first and second beam in extended position, to allow the arm and third support to be positioned below the container, more in particular within the outlines of the base frame.

In order to keep the construction simple, it is possible to connect the arm at a fixed angle, i.e. several degrees, such as 0 to 5 degrees, or to connect the arm under an angle of around 2 to 3 degrees to the first beam.

In a further preferred model, the arm can be moved between a supporting position, in which the third support touches the basis, and a suspended position, in which the third support does not touch the basis. As such any possible hinder—due to the third support—while moving the frame and holder can be prevented. Moving the third support could for example be made possible by fixing the arm as a rotation axis, parallel in longitudinal direction, whereby the arm, specifically the supporting position, can be fixed in one or several suspended positions.

For the positioning of the support in a suspended position, while positioning the floor in the lower frame, the rotation axis could be equipped with a cam, which is oriented as such that it will be moved when the base is positioned into the frame. In general the floor is a relatively heavy component, which is why the weight can be used to put pressure on the control unit, and for example to overcome pre-stress, caused by a resilient element, forcing the arm to the supporting position. If the floor is lighter in weight, the weight required for the operation could—partially—be represented by the products loaded onto the holder floor.

In order to increase the stability, it could be ensured that in a supporting position, the folded lower frame tilts in the direction in which the arm will extend. After all, with the lower frame, a vertical extending holder or container will also be in a 'tilted position', so that its mass centre will also be between the first and third support.

The floor could be used to obtain a movable weight above the lower frame, whereby it can be connected to the second beam in a rotational manner and whereby the floor—in the lower frame's extended position—can rest in or on the lower frame, and in the folded position of the floor and/or lower frame is situated above the second beam. In that case the lower frame has a stabile position, whereby it rests on the supports of the second beam and arm and the mass centre is at the centre of the support of the second beam and arm.

In general a fork-lift truck is used to position the holders. In extended position, it is more efficient to position several holders simultaneously. However with regard to the current technique used for holders, loading several holders onto a fork-lift truck could include the risk that one or several holders will fall off the truck. Whether or not in combination with the aforementioned measures, the lower frame of the invention at hand could be equipped with a coupler, at least for coupling the base frame in folded position to a similar lower frame. The similar lower frame can then be connected to a subsequent similar frame, etc. Practice has shown that for example, two, three, or even four or five holders can be lifted simultaneously.

The coupler is for example equipped with a operating element for the coupling or uncoupling of the base frame and the similar base frame by means of repositioning the operating element. It is preferred if the lower frame includes guides for at least guiding a fork-lift truck fork under the lower frame, whereby the guides are designed to reposition the operating element and as such for coupling the base frame, while positioning the fork under the base frame. Resulting thereof the coupling or uncoupling while removing the forklift truck, could also be automated, which could result in increased speed and safety.

For operation by means of a fork-lift truck, the operating element could also include a rotation cam, which has a fixed connection with a second cam, designed to be inserted in the opening of a similar lower frame, whereby the cam and connection means represent the coupler.

In an alternative model the operating element unit includes a movable pen which is adapted to be inserted in the opening of the similar lower frame, whereby the pen and opening as such form the coupler. The arm is a suitable location for the coupler. In order to allow cooperation with the lower frame cam to which a connection must be made, it is also feasible if the cam is rotational and the openings are provided for in the arm.

The invention will be explained based on the following illustrations.

Figure 1:
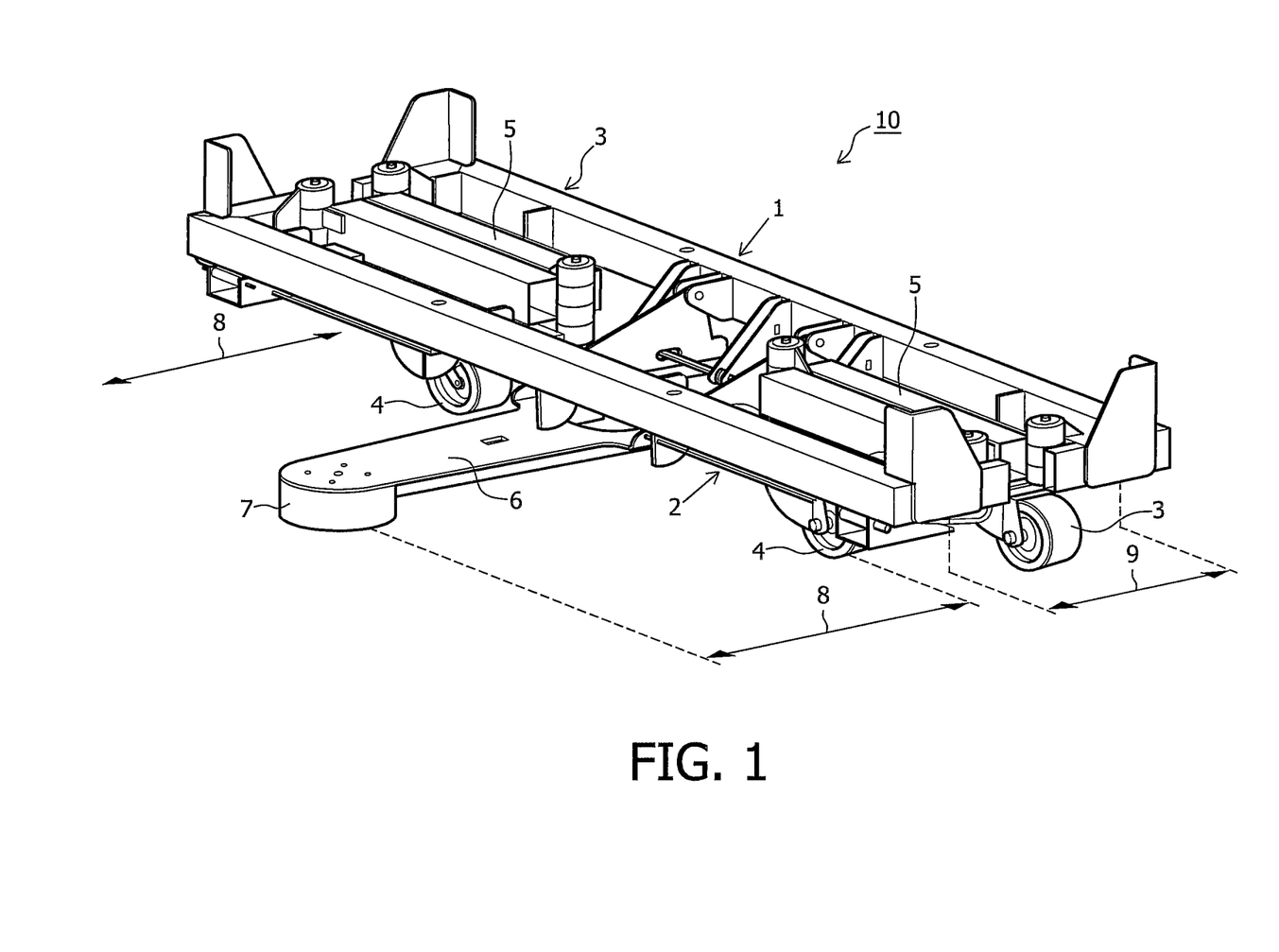
FIG. 1 illustrates a perspective top view on a base frame according to the present invention in a folded position.

FIG. 1 illustrates a base frame 10 for a product holder, including:
a first beam, equipped with at least one first support 3, formed by wheels 3 for supporting the first beam on the basis, a second beam 2, equipped with at least a second support 4, here formed by wheels 4 for supporting the second beam 2 on the basis. The first and second beam are connected at an adjustable distance by means of spacers 5 which are formed by foldable beams 5, for the mainly parallel positioning of the beams 1 and 2 of the base frame in at least the extended position. The design includes an arm 6, mainly extended in the direction of the second beam 2, for the third support 7—here a fixed support, however, it could be a wheel as well—which is connected to the first beam 1, for—at least in a folded position of the lower frame 10 and at a distance from the first beam 1—supporting the lower frame 10 on the basis. The illustrated supports 3 and 4 are castors, and the arm 6 is a fraction 8 longer than the distance 9 between the first and second beam in folded position.

Figure 2:
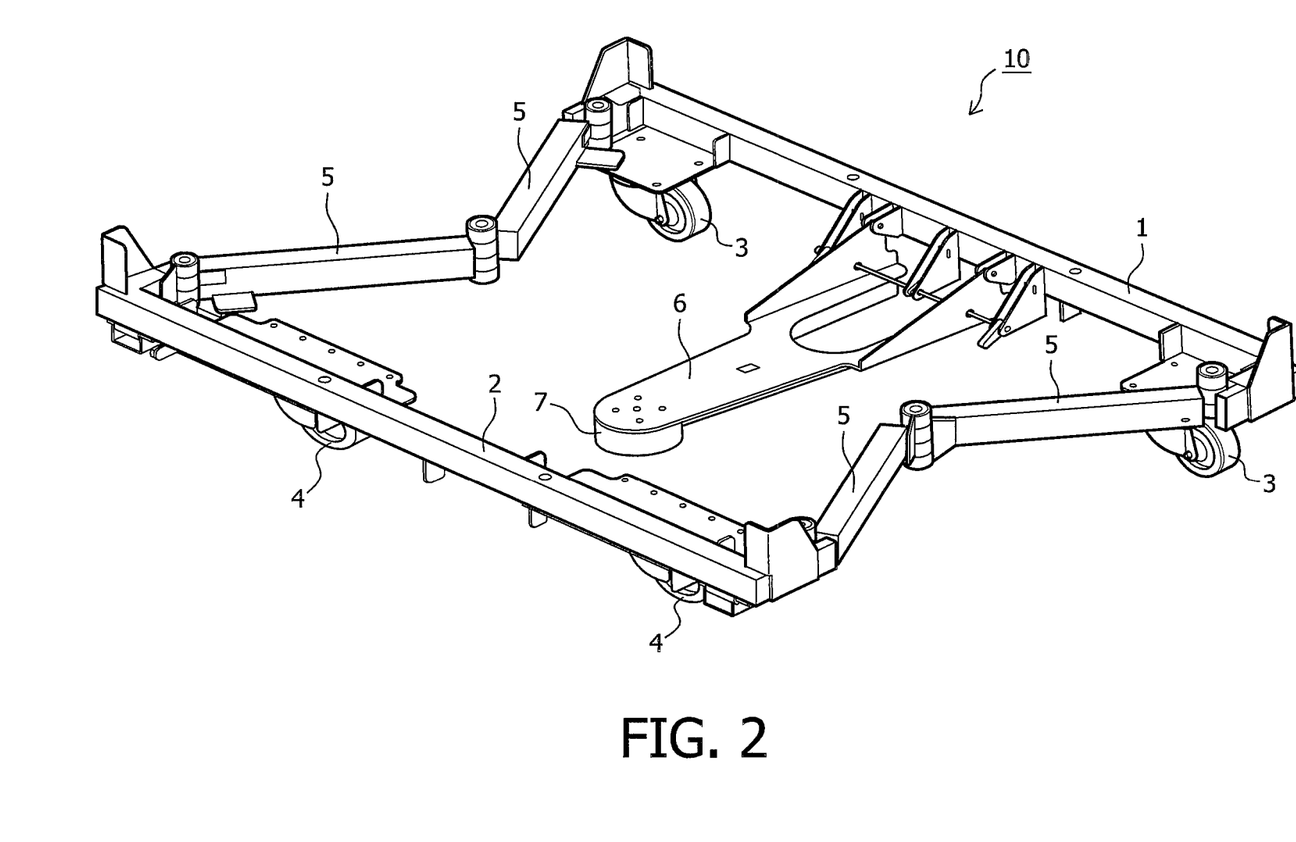
FIG. 2 illustrates a perspective top view on a base frame according to the present invention in a partially extended position.

FIG. 2 illustrates frame 10 from FIG. 1, in a partial extended status, in which is can be seen that the arm 6 is shorter than the distance between the first and second beam in extended position. As such it is ensured that the arm in extended position does not hinder the use of the frame and holder connected.

Figure 3:
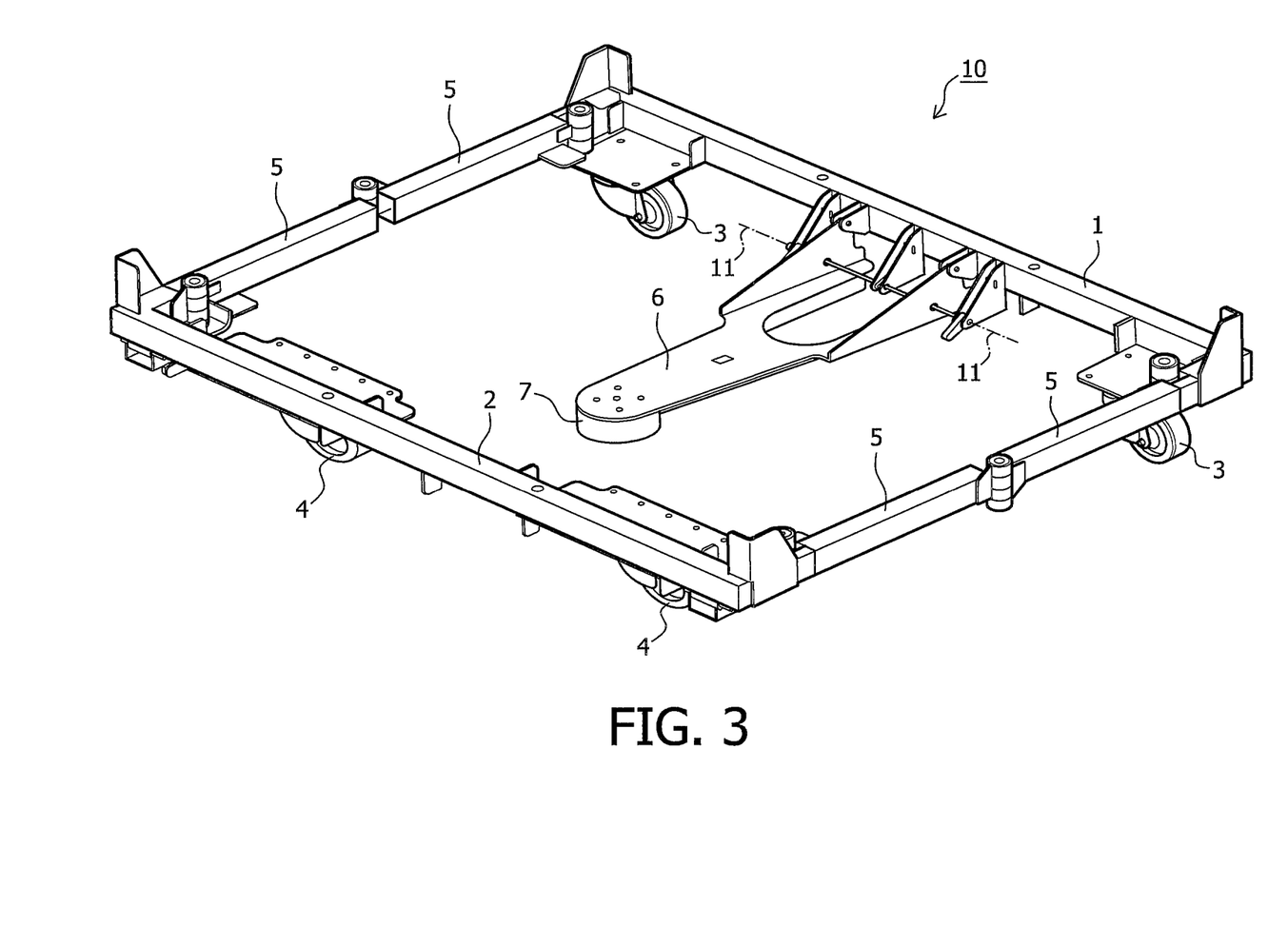
FIG. 3 illustrates a perspective top view on a base frame according to the present invention in a further extended position.

FIG. 3 illustrates a fully extended position of frame 10, in which the spacers 5, formed by the frame beams, are fully extended. In the illustration shown, a situation which in practice is applicable only during folding and extending the base frame 10 or a holder connected thereto, the arm support 6, 7 rests on the base, as do supports 3 and 4 of beams 1 and 2. The lower frame 10 is thus supported by the basis on five 5 locations. In a variant whereby the aim 6 is permanently connected to the beam 1, the support 7 is already suspended above the basis in this position.

Figure 4:
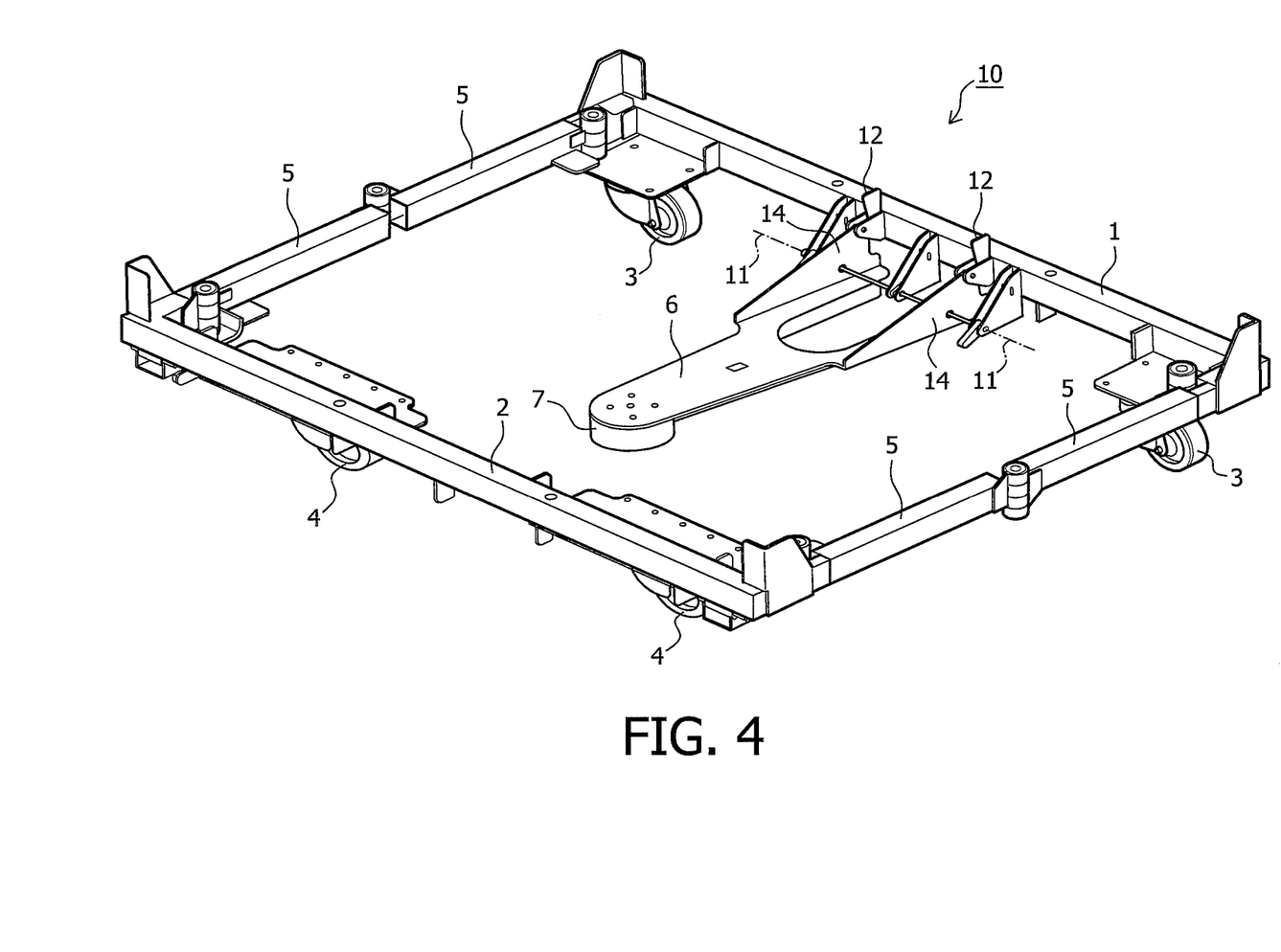
FIG. 4 illustrates a perspective top view on a base frame according to the present invention in a fully extended position.
Figure 5:
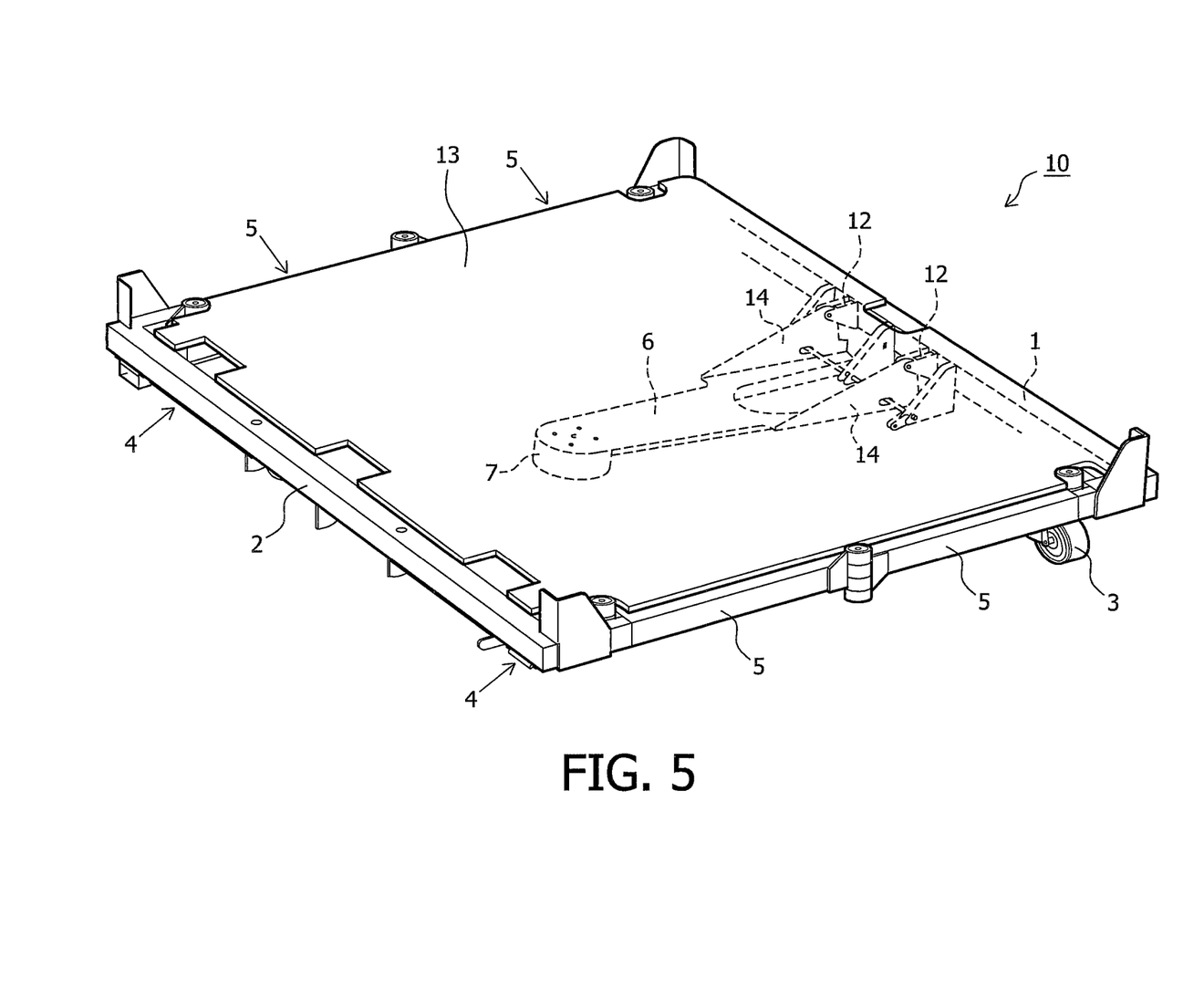
FIG. 5 again illustrates a perspective top view on a base frame according to the present invention in a folded position.

FIG. 4 once again reflects the situation of the basic frame in FIG. 3, but with tapered cams 12 incorporated in a base plate or floor 13, pictured in FIG. 5, in a position adjacent to the sides 14 of the arm 6. These sides protrude slightly in the direction of the first beam 1, past the rotation axis 11 of the arm 6. A lift is thus created. By positioning the base plate 13 with which the cams 12 are coupled, the arm 6 can be rotated and thus the support 7 can be lifted off the background.

FIG. 5 reflects the situation in which the arm 6 is tilted because the cams 12 linked to the base plate 13 have moved the sides 14 of the arm. The pressure required for this movement can be supplied by the weight of the base plate or floor 13, or by products (not reflected) positioned on it. This prevents any hindrance of the arm 6 and the support 7—both in cases where the support 7 is a fixed support as in cases in which this support comprises of a wheel, —during use and in particular in relocating in the collapsed position.

Figure 6:
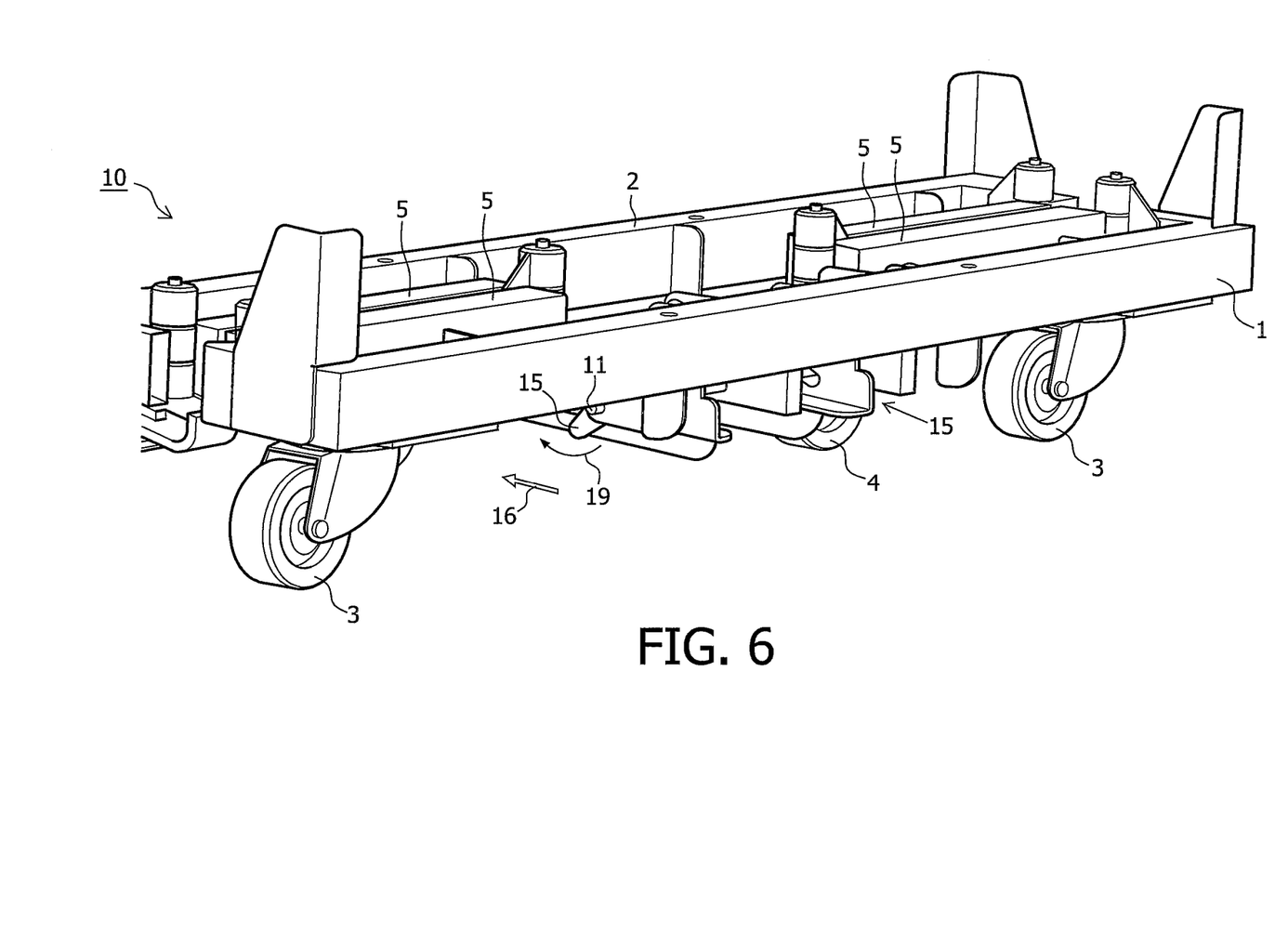
FIG. 6 illustrates a perspective side view on a base frame according to the present invention in a folded position.

FIG. 6 reflects the lower frame 10 in the previous figures in the collapsed situation as reflected in FIG. 1. One of the two cams 15 present is also reflected, that are intended to be operated by the prongs of a forklift truck. When a cam 15 is rotated in the direction of the arrow 16 by the prongs of a forklift truck to move in the direction of the arrow 19, a hook 17 (reflected in FIG. 7) also linked by the rotation axis 11 on which the cams 15 is confirmed, is turned down, to hook into an aperture of a similar basic frame, in order to link this similar frame to the lower frame 10.

Figure 7:
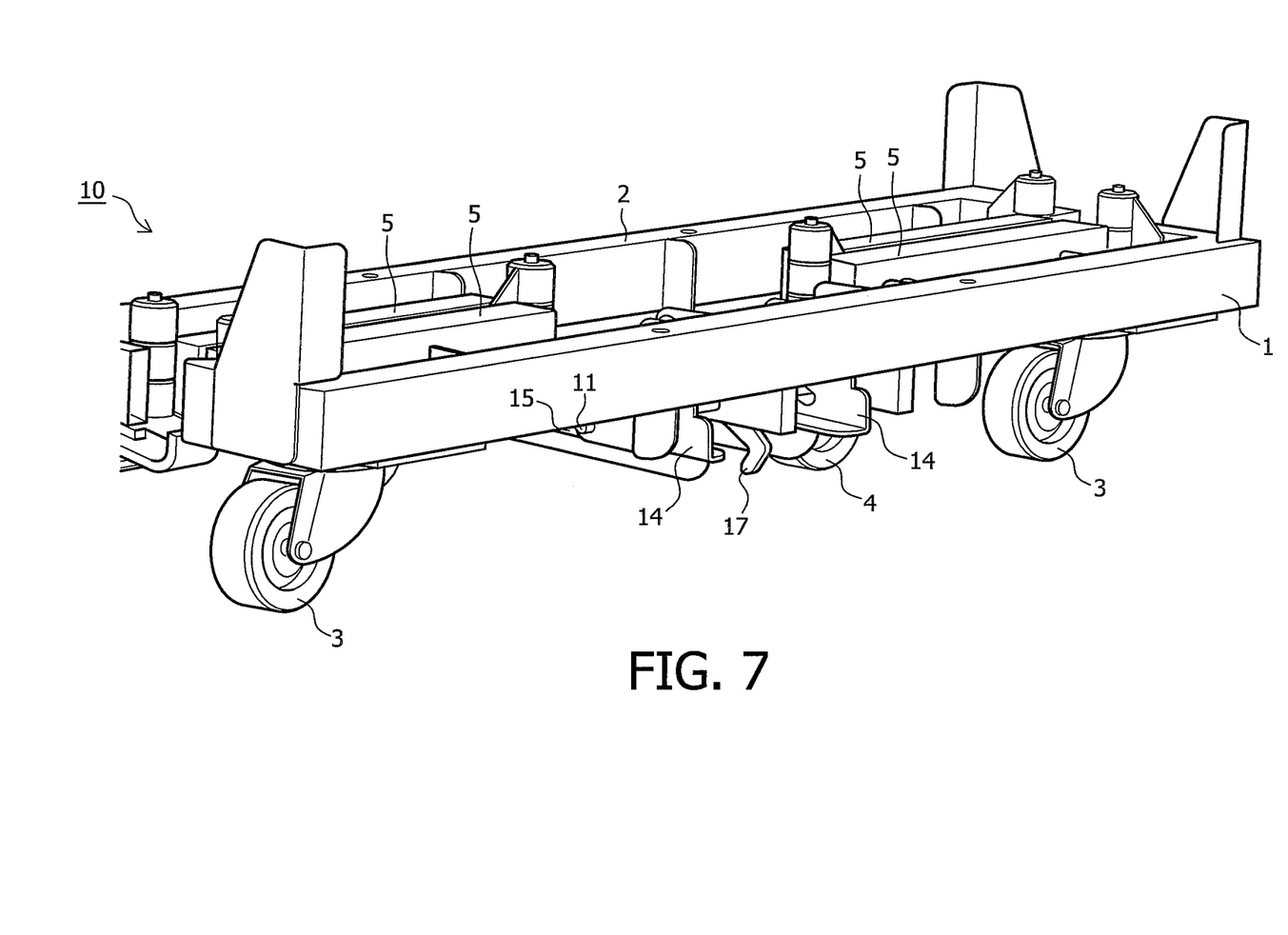
FIG. 7 illustrates a perspective side view on a base frame according to the present invention in a folded position.

FIG. 7 reflects hook 17 which is twisted down, to grip a similar frame. The rotation axis 11 in the indicated example is also the rotation axis of the arm 7, but in an actual construction, it is also possible to use different rotation axes. However, it is also possible to provide different forms of locking mechanisms, for instance by means of a pin to be moved by a forklift prong.

Figure 8:
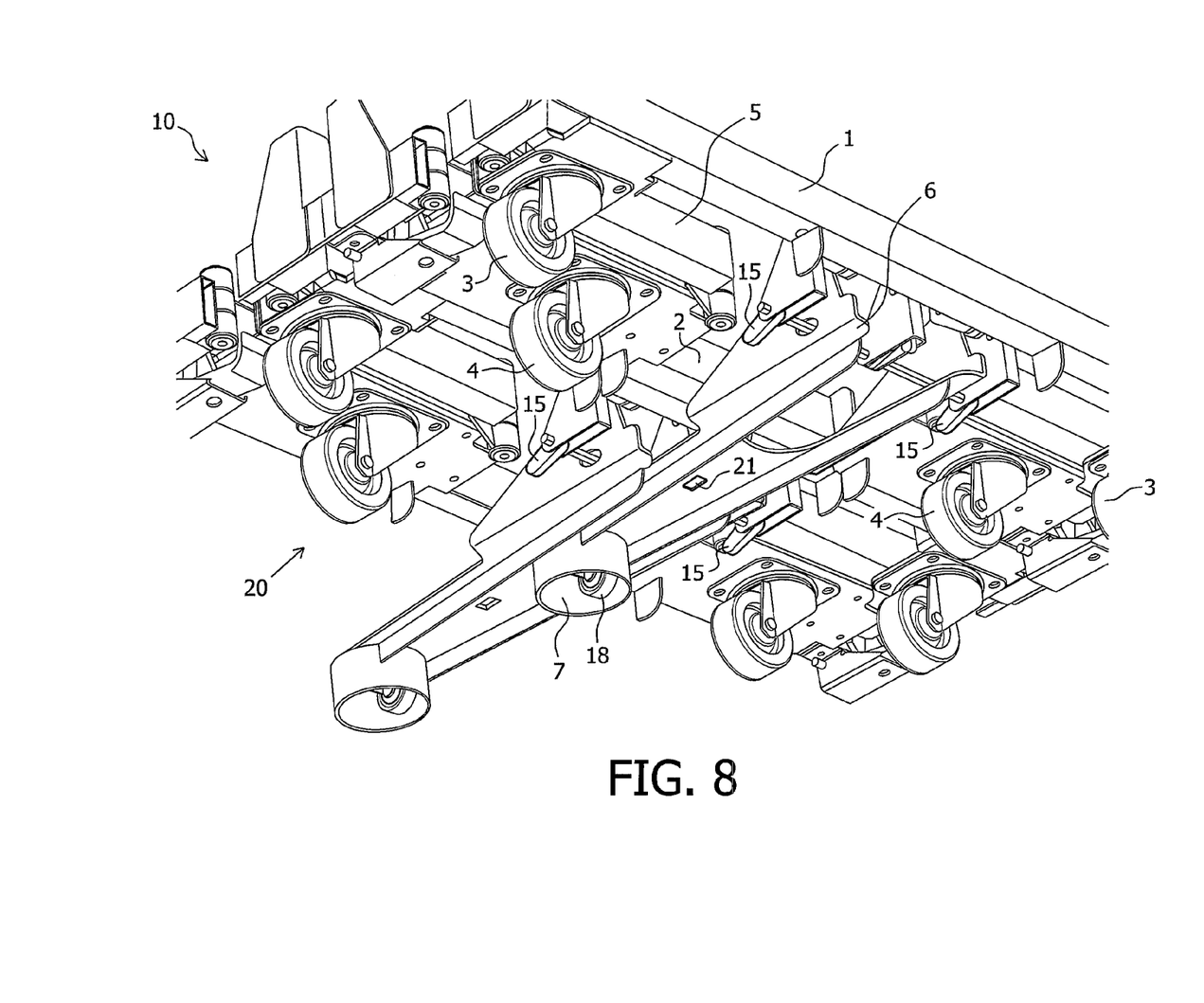
FIG. 8 illustrates a perspective bottom view on a base frame according to the present invention in a folded position.

FIG. 8 reflects the bottom view of the frame 10 in FIG. 6, with the similar frame 20 to be linked to this. Frame 10 in the arm 6 of the support 7 is fitted with an aperture 21, intended to accommodate a hook 17. It can be seen that the arm 6 is shaped tapered increasingly length-wise, to provide space to at least partially accommodate a similar arm. It can also be seen that the support 7 comprises of a wheel 18, in this case a castor or swivelling wheel 18. By twisting the ridges 15 of the similarly shaped basic frame, a hook 17 of the basic frame can be accommodated in aperture 21 of the arm of the similar basic frame.

Figure 9:
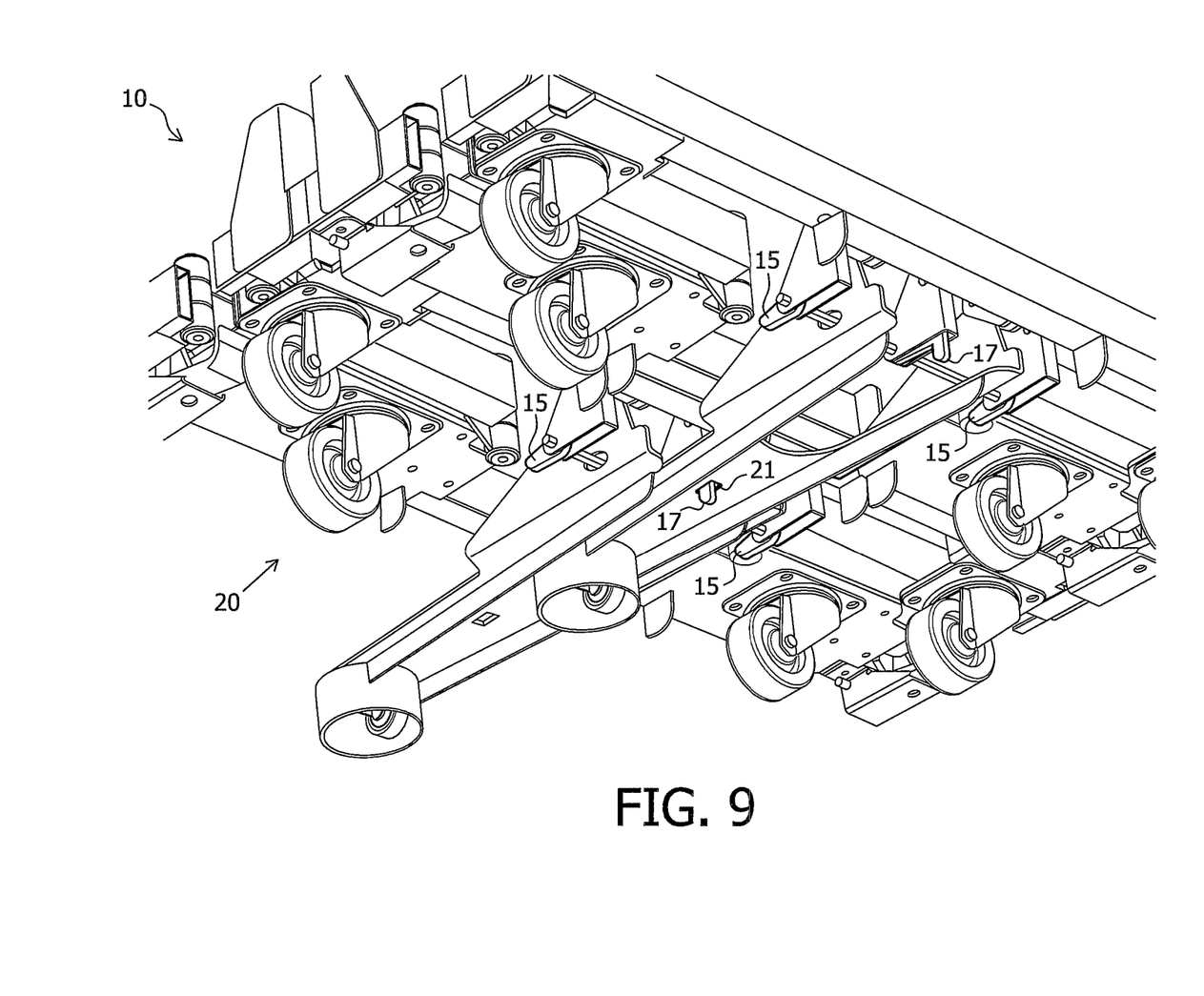
FIG. 9 illustrates a perspective bottom view on a base frame according to the present invention in a folded position.
Figure 10:
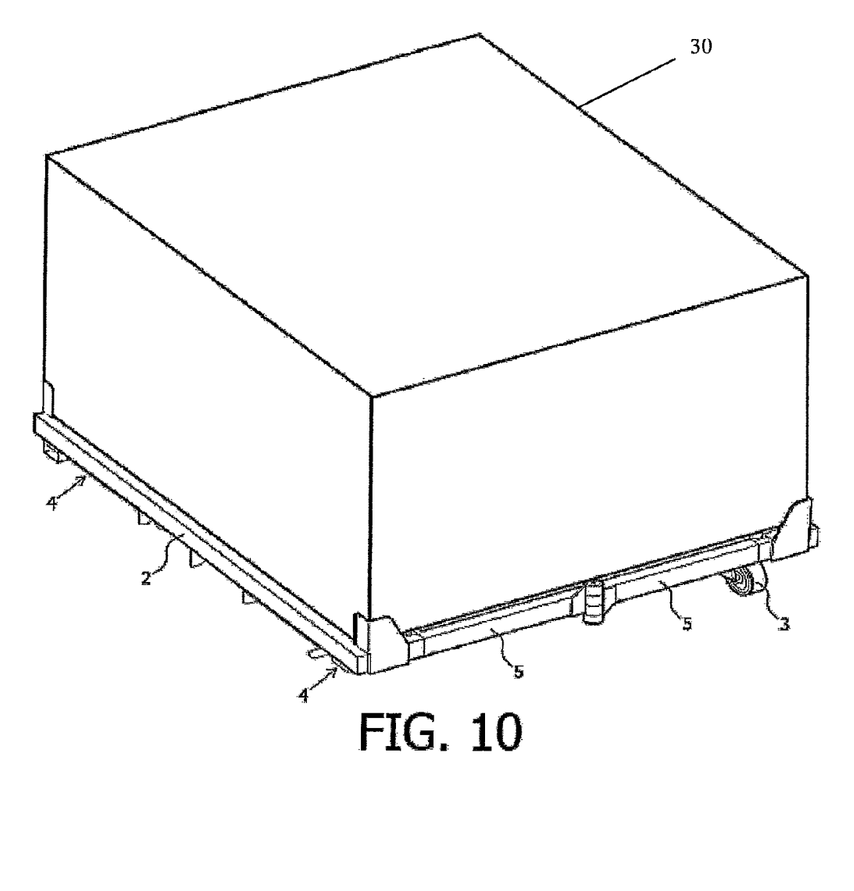
FIG. 10 illustrates a perspective view of a frame according to the present invention with a holder or container.

FIG. 9 reflects the basic frames 10 and 20 in FIG. 8 in the situation in which hook 17 of lower frame 20 is accommodated in aperture 21 of basic frame 10. To this end, the cams 15 are pushed back as far as possible by the prongs of the forklift truck (not depicted). To enable automatic disconnection when the forklift truck prongs are removed, it is preferable when the cams 15 and the hook 17 are applied under re-tension pushing them in the direction of the situation as reflected in FIGS. 6 and 8. Thus, it is possible to link and hoist a cascade of basic frames and therefore raised boxes or containers simultaneously. The number of basic frames, boxes or containers depends specifically on the height of the prongs and the carrying capacity of the forklift truck. FIG. 10 reflects the frame 10 according to the present invention with a holder or container 30.

Apart from the indicated designs, different variations are possible, all considered to fall within the protected range of the subsequent claims.

The invention claimed is:

1. A lower frame for a container for products, comprising:
   a first beam, provided with at least a first support for supporting the first beam on a basis;
   a second beam, provided with at least a second support for supporting the second beam on the basis, wherein the first beam is connected to the second beam by at least one spacer to enable substantial parallel positioning of the beams spaced apart in varying mutual distances in a collapsed state of the lower frame;
   an arm for a third support linked with the first beam, mainly extending in the direction of the second beam to support the lower frame on the basis on a distance from the first beam in a folded state of the lower frame,
   wherein the arm is shorter than the distance between the first and the second beam in the unfolded state; and
   wherein the arm is rotatable around an axis parallel to the longitudinal direction of the first beam and a rotation axis of the arm comprises a cam for positioning the support in the floating position when a floor is placed in the lower frame.

2. The lower frame according to claim 1, wherein at least the first support, the second support and/or the third support comprise a wheel.

3. The lower frame according to claim 1, wherein the arm is longer than a distance between the first and second beam in the collapsed state.

4. The lower frame according to claim 1, where the arm is adapted to be relocated between:
   a supporting position, in which the third support touches the basis, and
   a floating position, in which the third support is free from the basis.

5. The lower frame according to claim 1, wherein in a supporting position the lower frame tilts in a collapsed state in the direction in which the arm extends.

6. The lower frame according to claim 1, comprising a floor rotatably connected to the second beam for positioning the floor in or on the lower frame in at least the unfolded state of the frame.

7. The frame according to claim 1, comprising coupling means for coupling the lower frame to a similar lower frame in at least the collapsed state.

8. The lower frame according to claim 7, wherein the coupling means are provided with an operating element for coupling or uncoupling the lower frame to the similar lower frame during movement of the operating element.

9. The lower frame according to claim 8, comprising guiding elements for guiding at least one prong of a forklift truck under the lower frame, whereby the guiding elements are adapted to be used when the operating element is positioned or relocated under the lower frame, thus coupling the lower frame.

10. The lower frame according to claim 9, whereby the operating element comprises a rotatable cam with a second cam adapted to be accommodated in an aperture of the similar lower frame, wherein the cam and the aperture thus form the coupling means.

11. The lower frame according to claim 10, wherein the cam is rotatable around the rotation axis of the arm, and wherein the aperture is accommodated in the arm.

12. The lower frame according to claim 8, whereby the operating element comprises a portable pin, adapted to be accommodated in an aperture of the similar lower frame, the pin and aperture thus forming the coupling means.

13. The lower frame according to claim 7, wherein the coupling means are accommodated in the arm.

14. A holder or container, comprising a frame according to claim 1.

15. The holder or container according to claim 14, wherein the center of gravity of the holder is situated in at least the collapsed position above the second beam or on one of a first beam's averted sides of the second beam.

16. The holder or container according to claim 14, wherein the holder or container is collapsible.

17. The lower frame according to claim 1, wherein at least the first support, the second support, and/or the third support comprise a swiveling wheel.

* * * * *